May 23, 1939.　　　E. SCHROEDTER　　　2,159,772
THROTTLE CONTROL
Filed Sept. 27, 1938
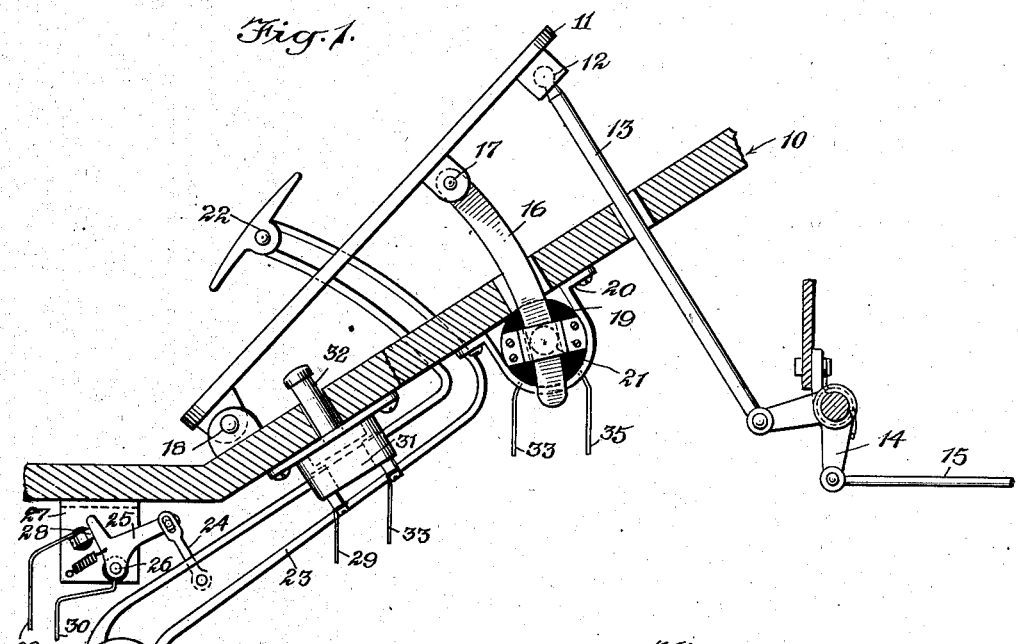
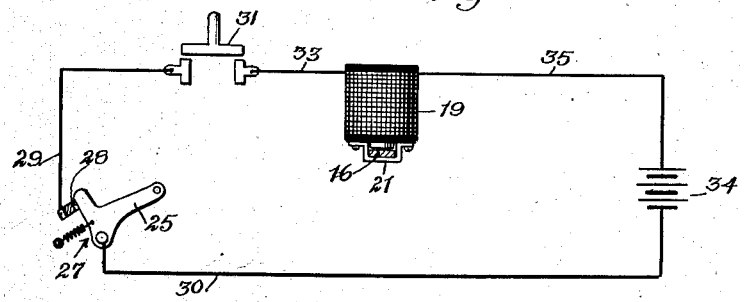
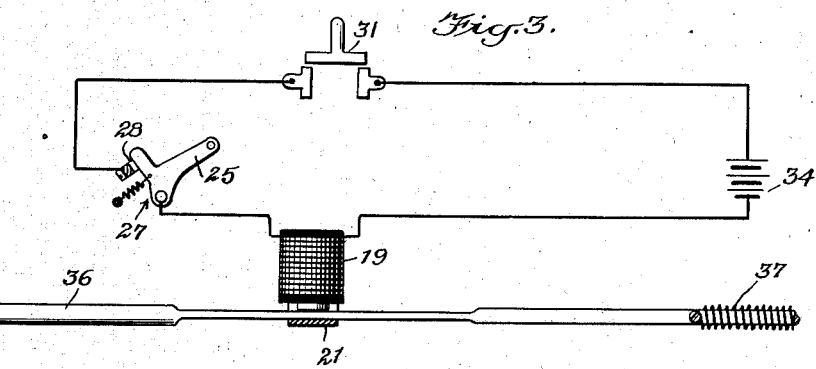
WITNESSES
INVENTOR
Edmund Schroedter
BY
ATTORNEYS Patented May 23, 1939

2,159,772

UNITED STATES PATENT OFFICE 2,159,772

THROTTLE CONTROL

Edmund Schroedter, Baldwin, N. Y.

Application September 27, 1938, Serial No. 231,874

4 Claims. (Cl. 192—3)

This invention relates to automobiles, and more particularly to the accelerators thereof.

In present-day cars the foot accelerator is used to maintain the speed of the car. As is common knowledge, this accelerator consists of a foot pedal operated against a spring which, when free from pressure, allows only sufficient gas to pass into the motor to keep it running very slowly. When the car is in gear or in motion, the operator must keep his foot upon the accelerator and increase pressure when he desires increased speed. This factor has certain disadvantages in long drives on the open road where a constant rate of speed may be maintained. Some drivers use a hand throttle when on the open road, but this has many disadvantages, among them the possibility of changing circumstances which would require the sudden reduction of the speed of the car and making the use of the hand throttle cumbersome and annoying.

An object of this invention is to provide a mechanism whereby the speed of a car may be maintained without the driver's foot being kept on the accelerator pedal.

A further object is to provide a means to perform the functions indicated, which will be instantly released by the application of the brake.

Another object of the invention is to provide a device for the purposes mentioned, which may be selective in its use and which may be disconnected without inconvenience or trouble.

In the accompanying drawing—

Fig. 1 is a cross-sectional view of the floor board of a car having a conventional accelerator and brake pedal;

Fig. 2 is a diagrammatic view of the wiring of the device;

Fig. 3 is a diagrammatic view of a modified form adapted to a hand throttle.

In Fig. 1 I provide the conventional floor board 10 with the conventional accelerator pedal 11 connected by a universal joint 12 to rod 13 and extending through the floor board 10 to a bell crank lever 14 which in turn operates a rod 15 running to the throttle.

In addition to the conventional structure just described, I provide an arm 16 which is pivoted at 17 to the bottom of the accelerator pedal. The accelerator pedal 11 is pivoted at 18 to the floor board 10, and it will be seen that pressure on the accelerator pedal will cause the rod 13 and the arm 16 to move down through the floor board.

Immediately below the floor board 10 I provide a magnet 19 held in place by a clamp or sling 20 which is screwed or otherwise fastened to the bottom of the floor board 10. The magnet 19 is provided with a guide 21 to hold the arm 16 in its proper course. It will be seen that when the magnet 19 is energized and the accelerator pedal is pushed down, the magnet 19 will hold the accelerator pedal in whatever position the driver's foot leaves it. While the magnet will thus hold the pedal downward, it will not prevent further pressure on the pedal to increase the speed, and the arm 16 may be moved downwardly until the accelerator pedal is all the way to the floor.

On the conventional brake pedal 22 with the usual arm 23 I provide an arm 24 which connects with a switch member 25 pivoted at 26 to a switch 27 mounted on the bottom of the floor board 10. The switch 27 is essentially a make-and-break switch, and it will be seen that when the brake pedal 22 is pressed, the arm 23 will pull the switch member 25 away from the contact point 28 to break the connection between the wires 29 and 30. This will de-energize the magnet 19 and allow the accelerator pedal to spring upwardly as it normally would when the foot is removed from the accelerator.

Since the use of this device would be undesirable in heavy traffic where frequent starts and stops must be made, I provide a switch 31 preferably mounted on the bottom of the floor board 10 and having a button 32 extending through the floor board adjacent to the accelerator. This switch is of the conventional form used in cars today to raise and lower the beam of headlights, and successive pressure on the button 32 will open and close the circuit between the wires 29 and 33. In wiring my device the wire 30 runs from the battery 34 to the switch 27, and a wire runs from the switch 27 to the switch 31. A further wire 33 runs from the switch 31 to the magnet, and a wire 35 runs directly from the battery 34 to the magnet 19.

In the modified form shown in Fig. 3, a hand throttle 36 on the instrument board is provided with a similar magnet and operates against a spring 37. It will be seen that when the switch 31 is closed to put the device in operation, the hand throttle 36 may be pulled out and remain open. When the brake pedal 22 is touched, the circuit will be broken and the spring 37 will return the hand throttle to the closed position.

In operation the driver of the car will determine whether or not he desires to use the automatic throttle control. In the event that he does, he presses the button 32 with his foot, thus operating the make-and-break switch 31 and closing the circuit between the wires 29 and 33, and presses upon the accelerator pedal 11 which will remain down in view of the action of the magnet 19 upon the arm 16. Should an occasion arise to decrease the speed, a touch of the brake pedal 22 will open the switch 27 and break the current between the wires 29 and 33. The foot accelerator will then be free to move upwardly to close the throttle. Should the driver wish to discontinue the use of the automatic throttle control, he merely presses the button 32 again breaking the current between the wires 29 and 33 and operates his car as though the automatic throttle control was not there.

While I have shown specific types of switches and wiring, it will be appreciated that these may be varied in many ways without departing from the conceptive idea of my invention.

I claim:

1. The combination with an accelerator and a brake pedal, of an arm on said accelerator, a magnet contacting said arm to yieldingly hold said arm at selective positions, and means cooperating with said brake pedal to de-energize said magnet.

2. The combination with an accelerator and a brake pedal, of an arm on said accelerator, a magnet cooperating with said arm to fix the position of said accelerator, means cooperating with said brake pedal to de-energize said magnet, and additional means to permanently de-energize said magnet.

3. The combination with an accelerator and a brake pedal, of an arm positioned on said accelerator, a magnet contacting said arm and adapted to yieldingly position said arm when said magnet is energized, means for permanently energizing or de-energizing said magnet, and additional means cooperating with said brake pedal to temporarily de-energize said magnet.

4. The combination with a floor board having a foot accelerator and a brake pedal mounted thereon, of a magnet mounted below said floor board, a guide member on said magnet, an arm pivoted to said accelerator and extending through said floor board and guide member, means for energizing said magnet to hold said arm, a switch member mounted on said floor board to permanently energize or de-energize said magnet, and an additional switch member mounted on said brake pedal to temporarily de-energize said magnet when the brake pedal is pressed.

EDMUND SCHROEDTER.